Nov. 2, 1948.  H. A. HUTCHINS  2,452,758
VEHICLE FRAME JOINT
Filed Feb. 1, 1946

INVENTOR.
Hugh A. Hutchins
BY
Attorney

Patented Nov. 2, 1948

2,452,758

UNITED STATES PATENT OFFICE 2,452,758

VEHICLE FRAME JOINT

Hugh A. Hutchins, Arcadia, Calif.

Application February 1, 1946, Serial No. 644,886

2 Claims. (Cl. 287—85)

This invention has to do with a vehicle frame and relates more particularly to a flexible frame or one involving a flexible connection acting to absorb shock between a wheel and the load carrying portion of the frame. It is a general object of the present invention to provide a vehicle frame of shock absorbing construction that is particularly useful in bicycles, motorcycles and like vehicles.

Vehicles of the general character that I have referred to usually require complicated and elaborate spring arrangements in order to effectively absorb shock between the wheel and the seat, and particularly between the rear wheel and the seat, since the seat is usually approximately above the rear wheel. The usual spring arrangements resorted to are not only bulky and cumbersome but are also generally expensive to construct and maintain, and they materially increase the weight of the vehicle.

It is a general object of my present invention to provide a vehicle frame which is flexible, that is, one which includes a flexible connection that effectively absorbs shock that would otherwise be transmitted to the seat. It is a feature of the construction that I have provided that it of compact, simple form and is entirely free of springs such as ordinarily characterize structures designed to absorb shock in vehicles of the type mentioned.

Another object of my present invention is to provide a joint construction for use in a vehicle frame which construction involves bearing means effectively centering the connected parts and holding them for relative pivotal movement and also including a shock absorbing element which effectively absorbs or cushions torsional strain between the connected parts.

Another object of the present invention is to provide a vehicle of the general type mentioned which has a unique fork construction for carrying the rear wheel, which fork is mounted through a sturdy, dependable bearing at which a shock absorber is located to cushion torsional strain or shock transmitted from the wheel through the fork.

Figure 1:
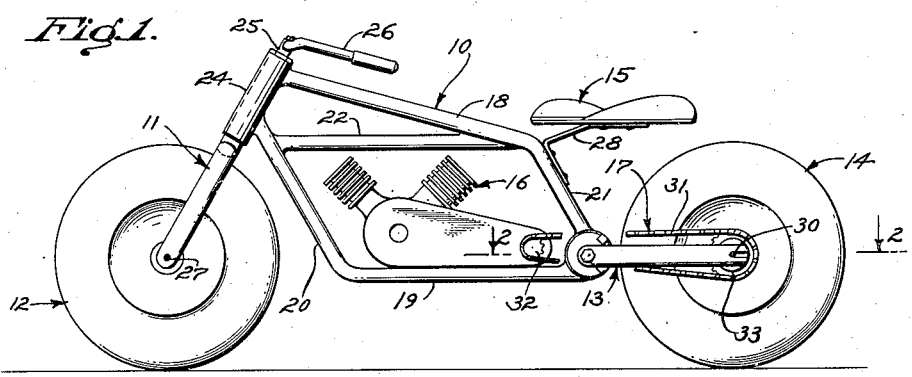
Figure 2:
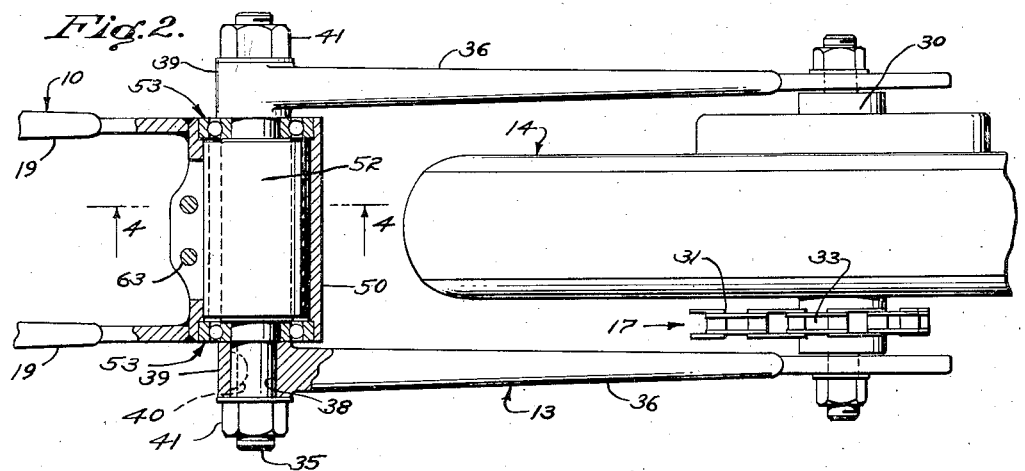
Figure 3:
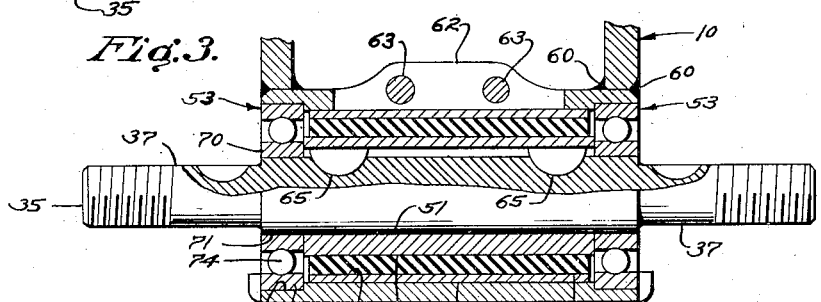
Figure 4:
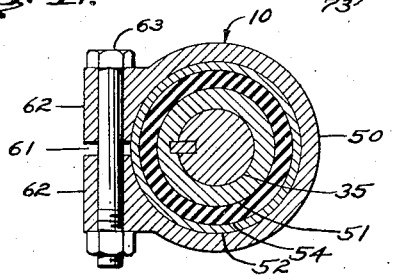

The various objects and features of my invention will be fully understood from the following detailed description of a typical preferred form and application of the invention, throughout which description reference is made to the accompanying drawings, in which:

Fig. 1 is a side elevation of a typical vehicle embodying the construction that I have provided. Fig. 2 is an enlarged plan view taken substantially as indicated by line 2—2 on Fig. 1. Fig. 3 is an enlarged longitudinal sectional view of the working parts of the mounting that I have provided for the fork that carries the rear wheel, and Fig. 4 is an enlarged detailed sectional view taken as indicated by line 4—4 on Fig. 2.

The construction that I have provided is applicable, generally to vehicle frames where it is desired to connect parts for pivotal movement and to provide shock absorbing means to resist such movement. The invention is particularly useful in or as applied to bicycles or motorcycles and, therefore, I have elected to describe it in such connection, it being understood that such specific reference is not to be construed as a limitation upon the broader principles of the invention.

The particular vehicle illustrated in the drawings being a motorcycle involves, generally, a main frame 10, a front fork 11 at the forward end of the frame carrying a front wheel 12, a rear fork 13 at the rear of the frame carrying a rear wheel 14, a seat 15 carried by the rear portion of the frame, a suitable engine 16 carried by the frame and a chain drive 17 between the engine and the rear wheel 14.

The main frame 10 may be a rigid structure including a plurality of frame parts or elements formed and assembled to suitably support or accommodate the various other elements of the structure. The particular frame illustrated involves an upper rail 18, lower rails 19, a front post 20, a rear post 21 and a brace bar 22. The rails 18 and 19 extend longitudinally of the vehicle while the posts 20 and 21 extend upward and forward from the front and rear ends of the rails 19, respectively. A tubular housing 24 is carried by the rail 18 and front post 20 at the forward end of the vehicle to rotatably support a stem 25 of the front fork 11 which stem projects above the housing 24 to carry suitable handle bars 26. The front wheel 12 is mounted in the fork 11 by a suitable axle 27.

The seat 15 that I have illustrated is supported on the upper rear portion of the frame through a suitable spring bracket 28 and the engine 16 that I have indicated is intended merely to typify an engine such as may be used in a vehicle of this type.

The rear fork 13 connects to the frame 10 through the mounting that I have provided and projects rearwardly from the frame to carry a suitable axle construction 30 which carries the rear wheel 14. The drive 17 that I have shown between the engine and the rear wheel is a chain drive involving a chain 31 driven by a sprocket 32 at the engine and driving a sprocket 33 at the rear wheel.

The rear fork 13 includes, generally, a shaft 35 that extends transversely of the vehicle and arms 36 that are fixed to the end portions of the shaft so that they are in suitably spaced relation and extend parallel and rearward to the point where they support the axle 30. In the preferred construction the shaft 35 has reduced end portions 37 that enter bores 38 provided in heads 39 on the forward ends of the arms 36. Suitable keys 40 or other means are provided to fix the heads against rotation on the shaft parts 37. In the particular case illustrated the heads 39 are retained on the shaft portions 37 by nuts 41 applied to the threaded outer end portions of the parts 37.

The mounting that I have provided for connecting the rear fork 13 to the rear end portion of the frame 10 involves, generally, a housing 50 which is carried by or is a part of the frame 10, a sleeve 51 which is fixed on the shaft to be in effect a part thereof, a tubular case 52 set in the housing 50, bearing means 53 between the housing 50 and the shaft 35 acting to center and rotatably support the shaft 35 in the housing 50 and a shock absorber or torque element 54 between the sleeve 51 and the case 52 absorbing torque between these parts.

The housing 50 is a mounting or carrier for the construction just referred to and is preferably formed as an integral or permanent part of the frame 10. In the preferred construction the housing 50 is a simple, tubular part arranged transversely of the vehicle and permanently secured to the frame parts 19 and 21 as by welding 60. In accordance with my invention the case 52 is adapted to be set or rigidly held in the housing 50 and to this end I may split the housing longitudinally as at 61 and provide the housing at the split portion with means for clamping it onto the case 52. In the particular construction illustrated flanges 62 are provided at the split portion of the housing and bolts 63 are provided for clamping the housing onto the case 52.

The sleeve 51 is, for convenience of manufacture, formed separate from the shaft 35 and is fixed or made secure thereon by keys 65 or the like. The sleeve is an elongate tubular element preferably made as long as possible, and when it is of substantial length it is preferred to provide a multiplicity of keys 65, as I have shown in the drawings.

The case 52 is a straight tubular part considerably larger in diameter than the sleeve 51 so that there is substantial clearance between these elements.

The bearing means that I have provided preferably includes spaced anti-friction bearings such as ball bearings at each end of the structure that I am describing. In the particular case illustrated each bearing includes an inner race 70 held on a seat 71 turned on the end portion of the shaft, an outer race 72 held in a seat 73 turned in the end portion of the housing 50, and a series of balls 74 operating between the races. The bearings may be retained in position in any desired manner. In the particular case illustrated end portions of the housing 50 extend somewhat beyond the bearings and after the bearings have been arranged in position the projecting end portions of the case are turned in at one or more points as shown in Fig. 3 so that the bearings are retained.

The shock absorbing element 54 that I have provided is an annular body of rubber or the like that extends longitudinally of the sleeve and case between the bearings that support the sleeve in the case. In accordance with my invention the body of rubber is vulcanized or otherwise permanently bonded to the inner surface 76 of the case and the outer surface 77 of the sleeve. In practice these surfaces can be suitably treated, roughened, or otherwise finished to effectively receive the rubber or like material that is employed, it being important that a permanent secure bond be established between the rubber and both the sleeve and the case.

In employing the construction that I have provided the parts are assembled as shown in Fig. 2 and when the case 52 is in the desired rotative position in the housing 50 to bring the arms 36 of the fork to the proper angle relative to the frame, the clamp bolts 63 are made tight. With the parts thus set in operating position the bearings that support the shaft within the housing maintain the shaft properly centered in the housing and take thrust that occurs by reason of the drive established between the frame and the rear wheel, and various other forces that tend to move the shaft out of its central position in the case. As the vehicle is used road shock not absorbed by the tire of the rear wheel is communicated to the rear fork or to the arms 36 thereof and in turn is communicated to the sleeve 51 through the shaft 35 of the fork. Such shocks or strains are effectively absorbed and in practice are all but eliminated by the shock absorbing element 54 that couples the sleeve 51 and the case 52. The body of rubber that forms the shock absorbing element works or gives as the shaft 35 tends to rotate the case 52, with the result that there is a very effective and desirable cushioning action obtained, eliminating all sharp shocks or vibrations. It will be understood that varying degrees of shock absorbing action can be obtained by varying the character or hardness of the rubber absorbing element 54, and that variations in the action can be obtained by varying the shape and proportioning of the shock absorbing element.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A pivotal connection between two members including, a split housing fixed to one member, a case arranged in the housing, means clamping the housing onto the case, a sleeve fixed to the other member, bearing means mounting the sleeve centrally in the case and for relative rotation between the sleeve and case, and a body of shock absorbing material between and fixed to the case and sleeve.

2. A pivotal connection between two members including, a split housing fixed to one member, a case arranged in the housing, means clamping the housing onto the case, a sleeve fixed to the other member, bearing means holding the sleeve in the case centrally thereof and for relative rotation between the sleeve and case, and a body of shock absorbing material between and fixed to the case and sleeve, the bearing means including anti-friction bearings at each end of the connection.

HUGH A. HUTCHINS.

(References on following page)

REFERENCES CITED

The following references are of record in the file of this patent:

UNITED STATES PATENTS

| Number | Name | Date |
|---|---|---|
| 644,788 | Williams | Mar. 6, 1900 |
| 973,217 | Sager | Oct. 18, 1910 |
| 1,047,431 | Michaelson | Dec. 17, 1912 |
| 1,147,415 | McLeod | July 20, 1915 |
| 1,827,233 | Hughes | Oct. 13, 1931 |
| 1,937,581 | Lord | Dec. 5, 1933 |
| 1,958,119 | Tarr | May 8, 1934 |
| 2,082,147 | Bryant | June 1, 1937 |
| 2,092,613 | Olley | Sept. 7, 1937 |
| 2,346,574 | Guy | Apr. 11, 1944 |
| 2,349,762 | Schwinn | May 23, 1944 |

FOREIGN PATENTS

| Number | Country | Date |
|---|---|---|
| 485,605 | Great Britain | May 23, 1938 |
| 728,095 | France | Apr. 5, 1932 |